United States Patent [19]

Maier et al.

[11] Patent Number: 5,062,314
[45] Date of Patent: * Nov. 5, 1991

[54] SHIFTING ARRANGEMENT FOR A MOTOR VEHICLE TRANSMISSION

[75] Inventors: Ulrich Maier, Freiberg/N.; Friedrich Raff, Eberdingen, both of Fed. Rep. of Germany

[73] Assignee: Dr. Ing. h.c.F. Porsche AG, Fed. Rep. of Germany

[*] Notice: The portion of the term of this patent subsequent to Jan. 29, 2008 has been disclaimed.

[21] Appl. No.: 567,645

[22] Filed: Aug. 15, 1990

Related U.S. Application Data

[63] Continuation-in-part of Ser. No. 302,387, Jan. 27, 1989, Pat. No. 4,987,387.

[30] Foreign Application Priority Data

Mar. 10, 1988 [DE] Fed. Rep. of Germany ....... 3807881
Aug. 24, 1989 [DE] Fed. Rep. of Germany ....... 3927922

[51] Int. Cl.⁵ .................. F16H 59/02; G05G 5/06
[52] U.S. Cl. .................. 74/475; 74/473 R; 74/538
[58] Field of Search ............ 74/473 R, 491, 475, 74/538

[56] References Cited

U.S. PATENT DOCUMENTS

| 4,126,054 | 11/1978 | Langford et al. | 74/491 X |
| 4,630,499 | 12/1986 | Hopkins | 74/473 R |
| 4,646,582 | 3/1987 | Kijima | 74/473 R |
| 4,732,232 | 3/1988 | Miyagi et al. | 74/473 R X |

FOREIGN PATENT DOCUMENTS

| 2250985 | 4/1974 | Fed. Rep. of Germany . |
| 3006872 | 9/1981 | Fed. Rep. of Germany . |
| 3231991 | 3/1983 | Fed. Rep. of Germany . |
| 3410938 | 10/1984 | Fed. Rep. of Germany . |
| 3714285 | 11/1988 | Fed. Rep. of Germany . |
| 3807881 | 9/1989 | Fed. Rep. of Germany . |
| 3905769 | 9/1989 | Fed. Rep. of Germany . |

Primary Examiner—Allan D. Herrmann
Assistant Examiner—David W. Laub
Attorney, Agent, or Firm—Evenson, Wands, Edwards, Lenahan & McKeown

[57] ABSTRACT

A shifting arrangement for an automatic transmission of a motor vehicle controlled by an electronic control unit has a selector lever, the pivoting of which into a first shifting path, allows driving positions to be preselected, each driving position having various transmission gears which are to be shifted automatically. If the selector lever, by way of a transverse path, is changed over into a second shifting path which is parallel to the first shifting path, the transmission gears may be shifted manually by a pivoting in the second shifting path. In order to ensure a stable and vibration-free bearing of the shifting arrangement, the selector lever is disposed in a hollow frame which includes a pot-shaped bottom part made of a light metal casting and a cover plate screwed to the top of the bottom part.

10 Claims, 3 Drawing Sheets

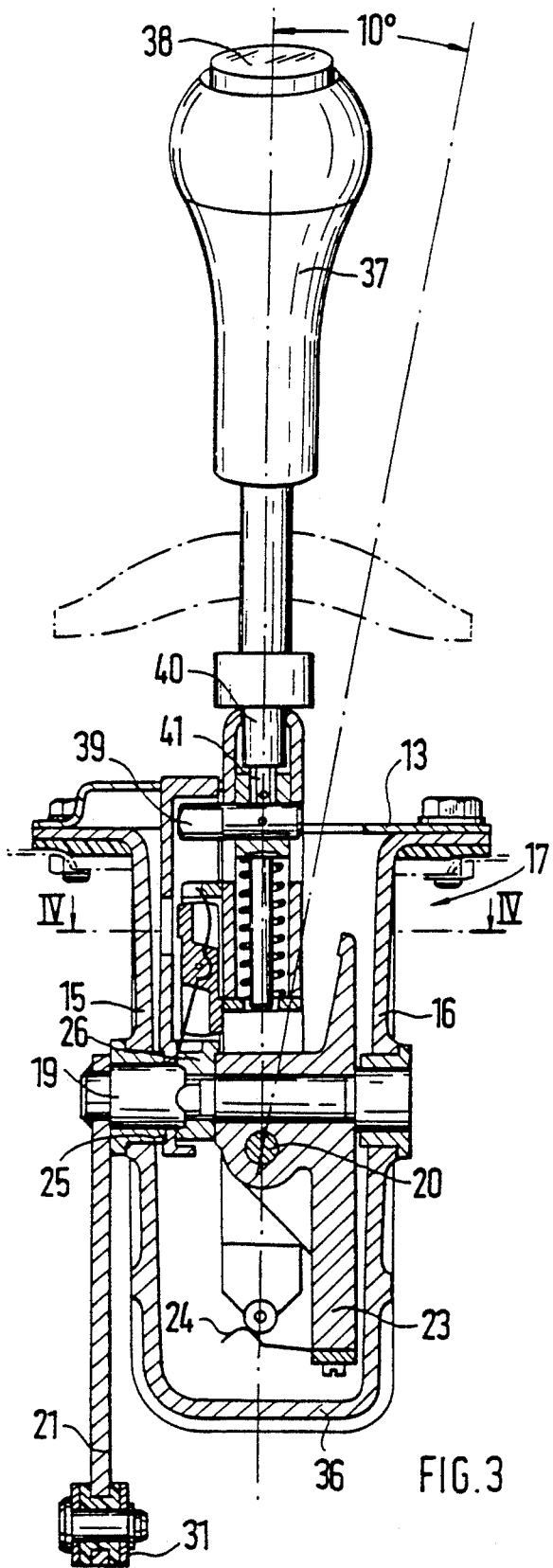
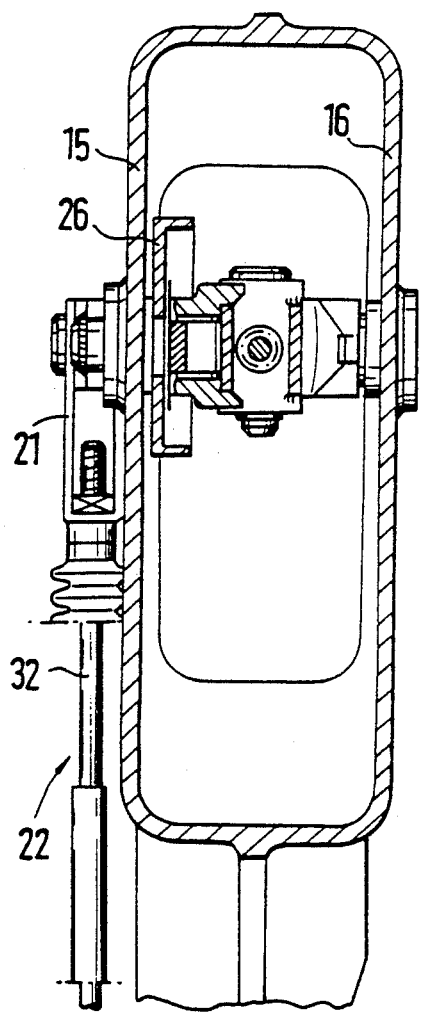
FIG.3
FIG.4

SHIFTING ARRANGEMENT FOR A MOTOR VEHICLE TRANSMISSION

This Application is a continuation-in-part of pending U.S. patent application, Ser. No. 07/302,387, filed on Jan. 27, 1989, claiming priority of German Application P 38 07 881.3, filed in Germany on Mar. 10, 1988. This Application is also related to U.S. patent application Ser. No. 562,930, filed on Aug. 6, 1990, claiming priority of German Application P 39 27 250.8, filed in Germany on Aug. 18, 1989 and U.S. patent application Ser. No. 567,788, filed on Aug. 15, 1990, claiming priority of German Application P 39 27 248.6, filed in Germany on Aug. 18, 1989.

BACKGROUND AND SUMMARY OF THE INVENTION

The present invention relates to a shifting arrangement for an automatic transmission of a motor vehicle controlled by an electronic control unit with a selector lever pivotable in first and second shifting paths, a pivoting of the selector lever in the first shifting path preselecting driving positions having various transmission gears which are to be automatically shifted, and a pivoting of the selector lever in the second shifting path causing a manual shifting of transmission gears, the second shifting path being parallel to the first shifting path, and the selector lever being movable via a transverse path between the first and second shifting paths.

A motor vehicle transmission of this type is described in German Patent Application P 38 07 881.3, upon which the patent application of this application is based. It combines the advantages of a conventional automatic transmission and of a gearbox that is to be shifted manually. When the selector lever is pivoted in a first shifting path, the various selectable positions of an automatic transmission can be preselected. If the selector lever, by way of a transverse path, is changed over into a second shifting path which is parallel to the first shifting path, the forward gears of the transmission can be shifted directly via the selector lever by a pivoting in this second shifting path, which is advantageous for a sporty driving method.

An object of the present invention is to provide a shifting arrangement for this type of a motor vehicle transmission which has a high rigidity with respect to form. An ergonomic design and a manufacturing and mounting which are reasonable with respect to cost are also important.

These and other objects are achieved by the present invention which provides a shifting arrangement for an automatic transmission of a motor vehicle controlled by an electronic control unit having a selector lever pivotable in first and second shifting paths. A pivoting of the selector lever in the first shifting path preselects driving positions having various transmission gears which are to be automatically shifted, and a pivoting of the selector lever in the second shifting path causes a manual shifting of transmission gears. The second shifting path is parallel to the first shifting path, and the selector lever is movable via a transverse path between the first and second shifting paths. The selector lever is disposed in a hollow frame, this hollow frame having a pot-shaped bottom part and a cover part fastened to the bottom part. In an embodiment of the invention, the hollow frame is cast of light metal.

By providing bearing points of the selector lever on both sides which are in a hollow frame fastened to the vehicle body, a form-rigid and vibration-free bearing of the selector lever can be achieved. Since the hollow frame comprises a pot-shaped cast bottom part and a removable cover which can be placed on top, the mounting of the selector lever and its bearings in the hollow frame presents no difficulties.

Other objects, advantages and novel features of the present invention will become apparent from the following detailed description of the invention when considered in conjunction with the accompanying drawings.

BRIEF DESCRIPTION OF THE DRAWINGS

FIG. 3 is a cross-sectional view of the shifting arrangement of FIG. 1.

FIG. 4 is a sectional view according to Line IV—IV of FIG. 3.

DETAILED DESCRIPTION OF THE DRAWINGS

Figure 1:
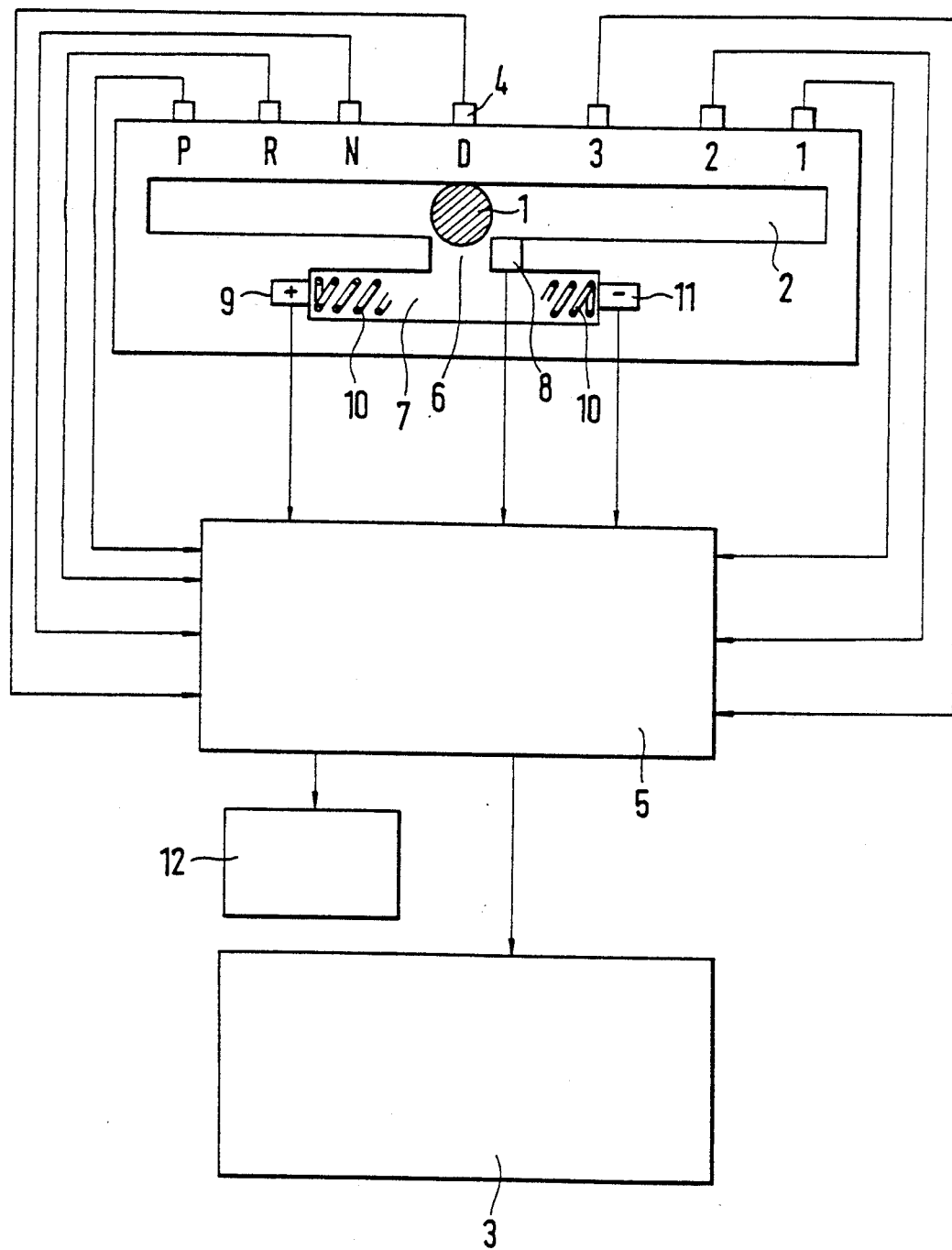
FIG. 1 is a view of the transmission control system with the shifting arrangement constructed in accordance with an embodiment of the present invention.

FIG. 1 shows a selector lever 1 which can be pivoted in a first shifting path 2 in the longitudinal direction of the motor vehicle, by which different positions of an automatic transmission 3 can be selected, such as P=parking; R=reverse; N=neutral-zero; D=drive with 4th gear, 3=3rd gear, 2=2nd gear, 1=1st gear. The selected positions are sensed by sensors 4 which emit electric signals to a control unit 5 of the transmission. From the selected position D, the selector lever 1, by way of a transverse path 6, can be changed over to a second shifting path 7 which is parallel to the first shifting path 2. The change-over operation is sensed by means of a sensor 8 which, in this case, supplies a signal to the control unit 5.

When the selector lever 1 is pivoted in the second shifting path 7 in the forward driving direction of the motor vehicle, a plus (+) sensor 9 responds, the signal of which causes the control units to carry out an upshifting at the transmission by one gear. Subsequently, the selector lever 1 is pressed back into the neutral center position of the shifting path 7 by a spring 10. When the sensor 9 is touched again, a further upshifting takes place by one gear unless the highest transmission gear is already engaged. When the selector lever 1 is pivoted against the forward driving direction, a minus (—) sensor 11 emits a signal to the control unit 1 and triggers a return shifting by one gear at the transmission 3. A visual display unit 12 is connected to the control unit 5 and displays the selected positions in the first shifting path 2 and the respective engaged transmission gear 1, 2, 3 or 4.

Figure 2:
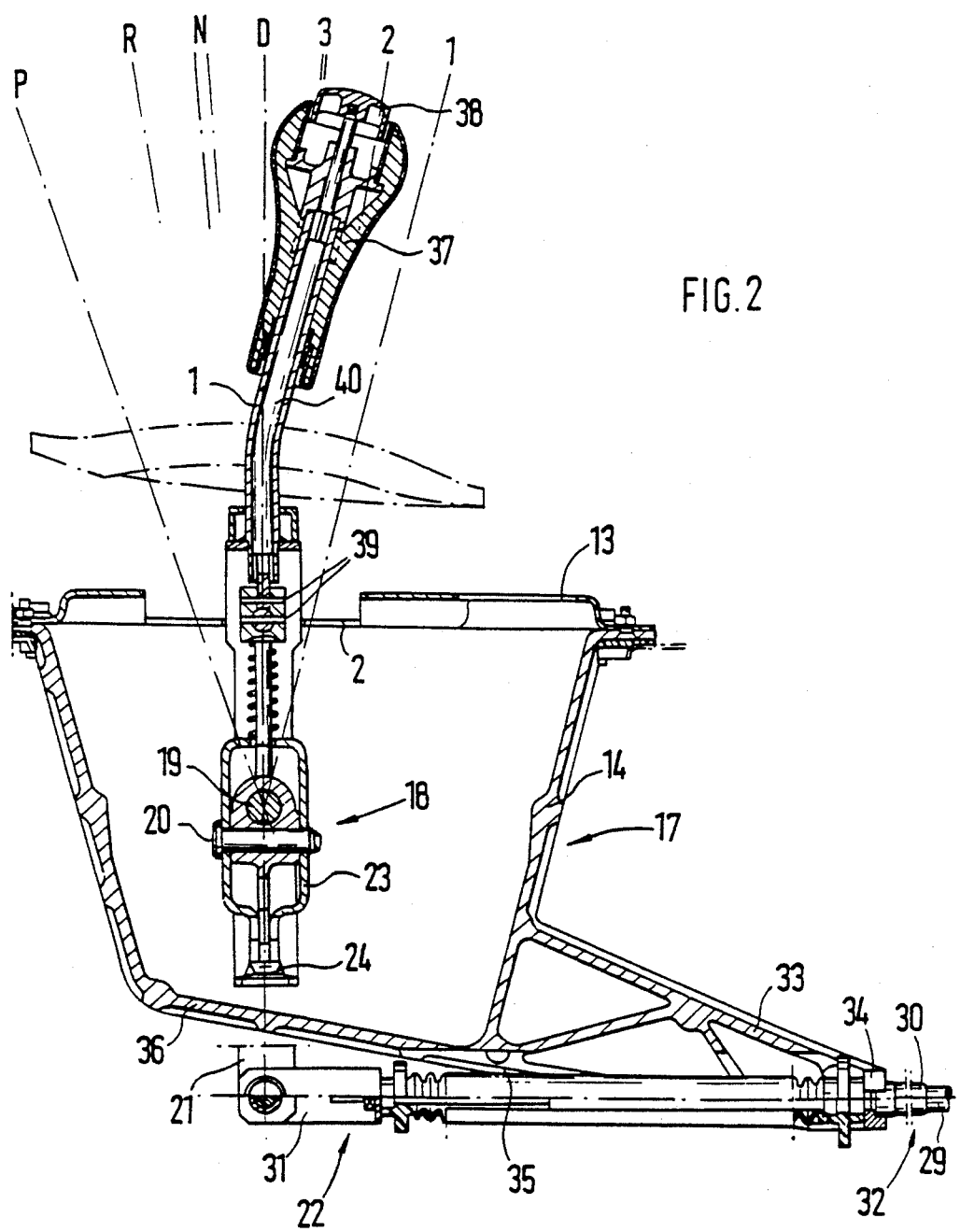
FIG. 2 is a longitudinal sectional view of the shifting arrangement of FIG. 1.

A more detailed illustration of an embodiment of the shifting arrangement is provided in FIGS. 2 and 3.

The first shifting path 2 extending in the longitudinal direction of the motor vehicle, and the second shifting path 7 as well as the transverse path 6 are constructed as shifting gates for the selector lever 1 in a cover plate 13. The cover plate 13 is screwed onto a pot-shaped bottom part 14, the walls of which are reinforced by ribs. Together, the cover plate 13 and the bottom part 14 form a hollow frame 17 which is fastened to the body of the motor vehicle. In the longitudinal sectional view (FIG. 2), the bottom part 14 is trapezoidal; in the cross-sectional view (FIG. 3), the bottom part 14 is rectangular. The part of the selector lever 1 projecting into the hollow frame 17 is connected with a cardan joint 18. The selector lever 1 can be pivoted around the two bearing pins 19 and 20 of the cardan joint 18 which are situated transversely with respect to one another.

The upper bearing pin 19 is disposed in two lateral walls 15 and 16 of the bottom part 14. The selector lever can be pivoted around the upper bearing pin 19 in order to execute selectable driving positions P, R, N, D, 3, 2, 1. For this purpose, starting from the central selectable driving position D, a swivel angle of a total of 34.6° is provided in the forward driving direction of the motor vehicle; in the opposite direction, a swivel angle of 28.2° is provided. During the pivoting, an actuating lever 21 is taken along which is fastened outside the hollow frame 17 to the bearing pin 19 and which, by means of an actuating rod system 22 linked to it, engages in the transmission 3 and actuates the sensors 4 for the selectable driving positions P, R, N, D, 3, 2, 1 which are disposed there.

A hinged frame 23 is connected with the lower area of the selector lever 1. When the driving positions are selected, this hinged frame 23 is pivoted along with the selector lever 1. In the hinged frame 13, the bearing pin 20 is disposed below bearing pin 19. When the selector lever 1 is changed over from the first shifting path 2 to the second shifting path 7, it is pivoted around this bearing pin 20. The required swivel angle amounts to approximately 10°. By means of a spring detent 24 acting on the bottom side of the selector lever 1 and fastened to the hinged frame 23, the change-over positions of the selector lever 1 are locked. When the selector lever 1, starting from position D, through the transverse path 6, is changed over into the second shifting path 7, a connection is released with respect to a taken along piece 26 which is non-rotatable on the bearing pin 19 by means of radial serrations 25. Thus, the rocking motions to be carried out in the second shifting path 7 are not transmitted to the selected-position sensors 4 disposed in the transmission 3.

A pivoting of the selector lever in the second shifting path of approximately 5° is sufficient in order to make the plus sensor 9 respond or, in the opposite direction, to make the minus sensor 11 respond, and trigger an upshifting or a return shifting by one gear at the transmissions. The plus sensor 9 and the minus sensor 11 and the sensor 8 that detects the change-over are electromechanical microswitches in the illustrated embodiment and are housed in a shift control housing which is screwed on top to the cover plate 13.

The actuating rod system 22 leading to the transmission 3 comprises a fork head 31 linked to the actuating lever 21 and a Bowden cable 32 which is fastened to it and can transmit pulling and pushing forces without any buckling.

The Bowden cable 32 comprises a wire cable 29 which can transmit pulling and pushing forces and a sleeve 30 guiding the wire cable 29 in the longitudinal direction. The sleeve 30 is fixed in bearing point 34 which is mounted at the free end of an extension arm 33 cast to the bottom part 14.

The extension arm 33 is reinforced by ribs and, together with the bottom part 14, forms a casting made of light metal. The bottom side 35 of the extension arm 33 is disposed flush as an extension of the floor 36 of the bottom part 14.

In order to place the grip 37 of the selector lever 1 at a location which is ergonomically advantageous for the driver while the position of the actuating rod system 22 is specified and the bearing of the selector lever 1 is in the hollow space 17, the selector lever 1 is bent in the upper area against the driving direction by an angle of approximately 15° in an embodiment of the present invention. As a result, it becomes necessary for the connecting member to be elastically bendable from a release head 38 extending longitudinally guided in the grip piece 37 to a locking arrangement 39 for the respective selected driving position. At the same time, the connecting member must be capable of transmitting pressure forces without buckling. Both demands can be met by a special Bowden cable which is stressable with respect to pressure, the wire part 41 of this Bowden cable being connected with the release head 38 on top and with the locking arrangement 39 on the bottom.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for an automatic transmission of a motor vehicle controlled by an electronic control unit comprising:
   a selector lever pivotable in first and second shifting paths, a pivoting of the selector lever in the first shifting path preselecting driving positions having various transmission gears which are to be automatically shifted, and a pivoting of the selector lever in the second shifting path causing a manual shifting of transmission gears, said second shifting path being parallel to the first shifting path, said selector lever being movable via a transverse path between the first and second shifting paths; and
   a hollow frame in which said selector lever is disposed, said hollow frame having a pot-shaped bottom part and a cover part fastened to the bottom part.

2. The shifting arrangement of claim 1, wherein the bottom part is cast of light metal and the cover part is fastened to the bottom part by screws.

3. The shifting arrangement according to claim 1, wherein the bottom part is trapezoidal in a longitudinal sectional view and rectangular in a cross-sectional view.

4. The shifting arrangement according to claim 3, further comprising an actuating rod system that is longitudinally slidable with the selector lever and leads to the motor vehicle transmission, and an extension arm mounted at an exterior side of the bottom part and which has a free end with a bearing point for the actuating rod system.

5. The shifting arrangement according to claim 4, wherein the bottom part is cast of light metal in one piece with the extension arm.

6. The shifting arrangement according to claim 5, further comprising ribs coupled to said extension arm and reinforcing said extension arm, and wherein said extension arm tapers conically from the bottom part to the bearing point.

7. The shifting arrangement according to claim 5, wherein the bottom part has a floor and the extension arm has a bottom side, the bottom side of the extension arm extending flush as an extension to the floor of the bottom part.

8. The shifting arrangement according to claim 4, wherein the actuating rod system comprises a fork head and a Bowden cable which is longitudinally guided in the bearing point and can transmit pulling and pushing forces.

9. The shifting arrangement according to claim 1, wherein the selector lever is bent in its upper area against a forward driving direction.

10. The shifting arrangement according to claim 9, wherein the selector lever includes a grip and a release button which can be moved longitudinally in the grip, and further comprising a Bowden cable which can be stressed with respect to pressure and extends centrically in the selector lever and is coupled to the release button, and a locking arrangement for locking individual preselected positions, said locking arrangement being connected to said release button by said Bowden cable.

* * * * *